United States Patent
Yonezawa

(10) Patent No.: US 9,574,910 B2
(45) Date of Patent: Feb. 21, 2017

(54) POSITION DETECTING APPARATUS, AND LENS APPARATUS AND IMAGE PICKUP APPARATUS INCLUDING THE POSITION DETECTING APPARATUS

(71) Applicant: CANON KABUSHIKI KAISHA, Tokyo (JP)

(72) Inventor: Takeshi Yonezawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 189 days.

(21) Appl. No.: 14/527,914

(22) Filed: Oct. 30, 2014

(65) Prior Publication Data

US 2015/0115142 A1  Apr. 30, 2015

(30) Foreign Application Priority Data

Oct. 30, 2013  (JP) ................. 2013-224848

(51) Int. Cl.
| | | |
|---|---|---|
| *G01D 5/347* | (2006.01) | |
| *G01B 11/14* | (2006.01) | |
| *G01D 5/245* | (2006.01) | |

(52) U.S. Cl.
CPC ........... *G01D 5/34776* (2013.01); *G01B 11/14* (2013.01); *G01D 5/2452* (2013.01)

(58) Field of Classification Search
CPC ..... G01B 11/14; G01D 5/347; G01D 5/34707; G01D 5/34715; G01D 5/3473; G01D 5/34776; G01D 5/34784; G01D 5/34792; G01D 5/245; G01D 5/2451; G01D 5/2452; G01D 5/2454; G01D 5/2455; G01D 5/2457; G01D 5/2458

See application file for complete search history.

(56) References Cited

U.S. PATENT DOCUMENTS

| | | | | |
|---|---|---|---|---|
| 5,260,568 A * | 11/1993 | Ieki | ...................... | G01D 5/2455 250/231.18 |
| 7,432,497 B2 * | 10/2008 | Sakagami | .............. | G01D 3/024 250/231.18 |
| 7,663,093 B2 * | 2/2010 | Kusano | ................ | G01D 5/2455 250/231.13 |

(Continued)

FOREIGN PATENT DOCUMENTS

| | | |
|---|---|---|
| JP | 0545151 A | 2/1993 |
| JP | 08304113 A | 11/1996 |

*Primary Examiner* — John Lee
(74) *Attorney, Agent, or Firm* — Rossi, Kimms & McDowell LLP

(57) ABSTRACT

Provided is a position detecting apparatus, including: a scale including pattern arrays formed in different cycles in a movement direction; an obtaining unit configured to obtain signals in accordance with a the plurality of pattern arrays; a phase calculator configured to calculate a phase of signals; a synchronism calculator configured to calculate a relative positional relationship between the obtaining unit and the scale by performing synchronism calculation of the phases calculated by the phase calculator; a synchronization error calculator configured to calculate a synchronization error in the synchronism calculation; and a determining unit configured to determine whether or not the synchronism calculation is normal by comparing the synchronization error and a predetermined threshold value with each other.

11 Claims, 13 Drawing Sheets

(56) References Cited

U.S. PATENT DOCUMENTS

| | | | |
|---|---|---|---|
| 8,993,955 B2* | 3/2015 | Nakamura | G01D 5/347 250/231.13 |
| 9,029,758 B2* | 5/2015 | Nakamura | G01D 5/34776 250/231.13 |
| 9,103,699 B2* | 8/2015 | Nakamura | G01D 5/34776 |
| 9,200,928 B2* | 12/2015 | Yonezawa | G01D 5/2452 |
| 9,228,857 B2* | 1/2016 | Shigeta | G01D 5/24466 |
| 2007/0069117 A1* | 3/2007 | Sakagami | G01D 3/024 250/231.13 |
| 2008/0315076 A1* | 12/2008 | Kusano | G01D 5/2455 250/231.1 |
| 2009/0256065 A1* | 10/2009 | Kusano | G01D 5/34776 250/231.1 |
| 2009/0272886 A1* | 11/2009 | Kusano | G01D 5/2454 250/231.1 |
| 2009/0283667 A1* | 11/2009 | Morimoto | G01D 5/24409 250/231.13 |
| 2012/0261561 A1* | 10/2012 | Horiguchi | G01D 5/262 250/231.1 |
| 2013/0056624 A1* | 3/2013 | Kato | G01D 5/347 250/231.1 |
| 2013/0099105 A1* | 4/2013 | Nakamura | G01D 5/347 250/231.1 |
| 2013/0169858 A1* | 7/2013 | Yamasaki | G03B 3/10 348/350 |
| 2013/0292556 A1* | 11/2013 | Nakamura | G01D 5/34776 250/231.1 |
| 2013/0292557 A1* | 11/2013 | Nakamura | G01D 5/34776 250/231.1 |
| 2014/0166865 A1* | 6/2014 | Okada | G01D 5/2448 250/231.1 |
| 2014/0277730 A1* | 9/2014 | Nakamura | B25J 13/088 700/258 |
| 2014/0292311 A1* | 10/2014 | Yonezawa | G01D 5/2452 324/207.17 |
| 2014/0306102 A1* | 10/2014 | Shigeta | G01D 5/24466 250/231.1 |
| 2014/0362464 A1* | 12/2014 | Kato | G11B 5/00813 360/52 |
| 2015/0076332 A1* | 3/2015 | Nagura | G01B 11/14 250/231.13 |
| 2015/0115142 A1* | 4/2015 | Yonezawa | G01B 11/14 250/231.1 |
| 2015/0116571 A1* | 4/2015 | Shigeta | G01B 11/14 348/335 |
| 2015/0130931 A1* | 5/2015 | Shigeta | G01D 5/34792 348/135 |
| 2016/0003644 A1* | 1/2016 | Yonezawa | G01D 3/08 250/231.1 |
| 2016/0135008 A1* | 5/2016 | Yonezawa | H04W 4/027 455/456.1 |

* cited by examiner

FIG. 7A  Atan1
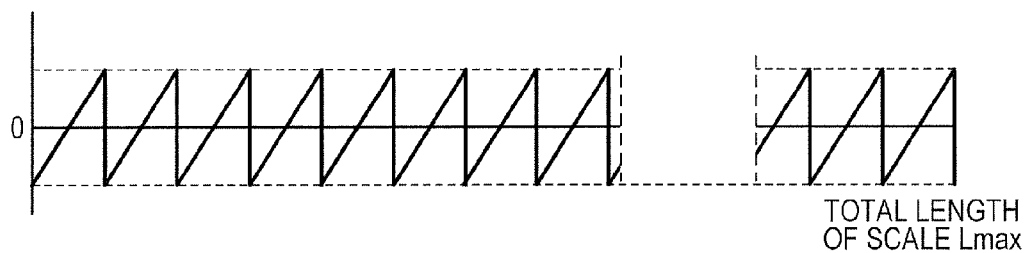
FIG. 7B  Inc1
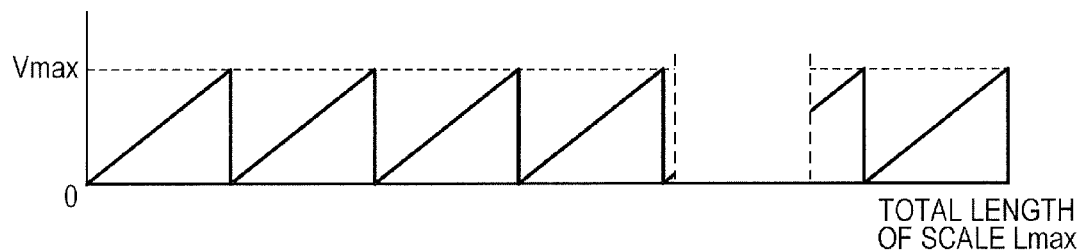
FIG. 7C  Inc2
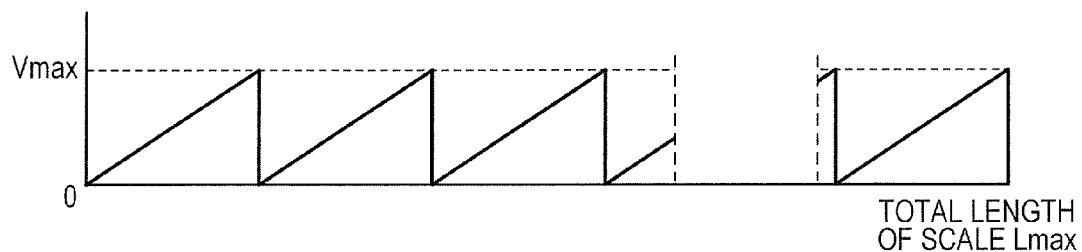
FIG. 7D  Pv1
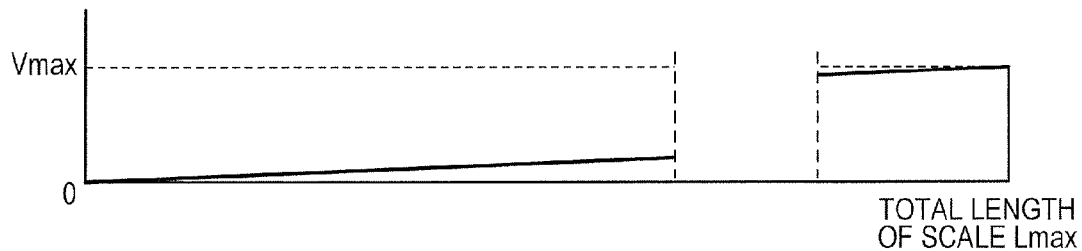

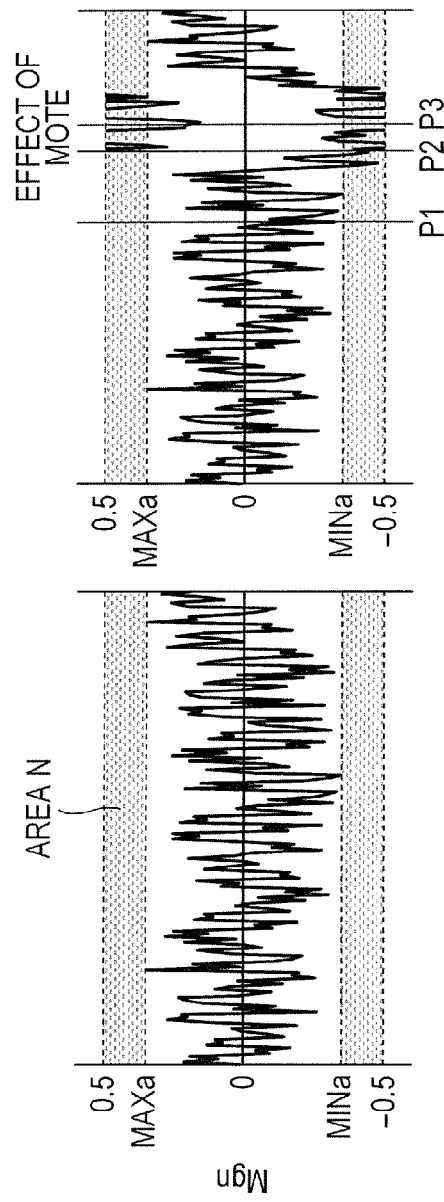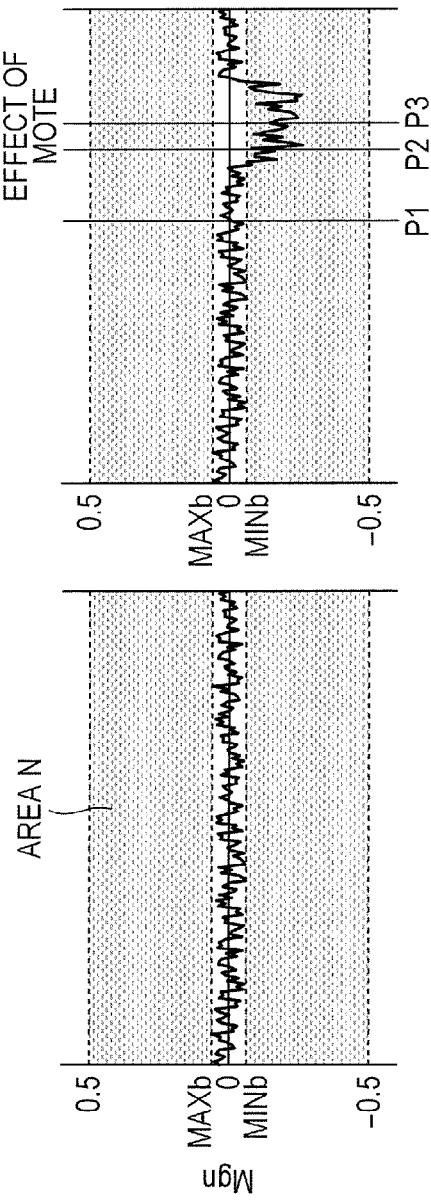

POSITION DETECTING APPARATUS, AND LENS APPARATUS AND IMAGE PICKUP APPARATUS INCLUDING THE POSITION DETECTING APPARATUS

BACKGROUND OF THE INVENTION

Field of the Invention

The present invention relates to a position detecting apparatus configured to detect a position of a movable member, in particular, a position detecting apparatus configured to detect a position of a movable member based on a plurality of signals, and to a lens apparatus and an image pickup apparatus including the position detecting apparatus.

Description of the Related Art

As an apparatus for measuring a distance of movement of an object, besides an incremental encoder for measuring a distance of relative movement, there is hitherto known an absolute encoder capable of detecting an absolute position.

Japanese Patent Application Laid-Open No. H08-304113 discloses a Vernier type absolute encoder. The Vernier type absolute encoder disclosed in Japanese Patent Application Laid-Open No. H08-304113 has a configuration including a main track and at least one sub track, which are formed by grid patterns having different pitches. Based on a slight shift between detected signals, which is generated due to a difference in pitch between the tracks, a position in a section over which the Vernier type absolute encoder circulates once is identified (hereinafter also referred to as "absolute position detection" or "absolute position calculation").

Japanese Patent Application Laid-Open No. H05-45151 discloses timing of switching to an absolute counting operation in the Vernier type absolute encoder. The Vernier type absolute encoder has a configuration in which tracks are formed at smaller pitches and at larger pitches. As the timing of switching to the absolute counting operation based on the tracks described above, when a speed is lowered to a speed at which erroneous detection does not occur in an incremental measurement at the smaller pitches, an operation of the Vernier type absolute encoder is switched to the absolute counting operation.

The above-mentioned related-art absolute encoders are configured to calculate an absolute position based on a slight shift between detected signals, which is generated due to a difference in pitch between the tracks, and hence are sensitive to scratches and motes on a scale. However, although an error can be found during inspection, there is no method of finding an error during absolute position detection.

In particular, when motes adhere to the scale after the inspection, there is a problem in that a different position may be detected erroneously during the absolute position detection.

SUMMARY OF THE INVENTION

It is an object of the present invention to provide a position detecting apparatus having high reliability, which is capable of determining the reliability of position detection even in the case where scratches and motes are present on a scale.

According to one embodiment of the present invention, there is provided a position detecting apparatus, including: a scale including a plurality of pattern arrays formed in different cycles in a movement direction; an obtaining unit configured to obtain a plurality of signals in accordance with the plurality of pattern arrays; a phase calculator configured to calculate a phase of a plurality of signals; a synchronism calculator configured to calculate a relative positional relationship between the obtaining unit and the scale by performing synchronism calculation of the plurality of phases calculated by the phase calculator; a synchronism synchronization error calculator configured to calculate a synchronization error in the synchronism calculation; and a determining unit configured to determine whether or not the synchronism calculation is normal by comparing the synchronization error and a predetermined threshold value with each other.

According to one embodiment of the present invention, the position detecting apparatus having high reliability, which is capable of determining the reliability of position detection, can be provided.

Further features of the present invention will become apparent from the following description of exemplary embodiments with reference to the attached drawings.

BRIEF DESCRIPTION OF THE DRAWINGS

FIG. 7A is a graph showing first and second relative position signals and a Vernier signal.

FIG. 7B is a graph showing first and second relative position signals and a Vernier signal.

FIG. 7C is a graph showing first and second relative position signals and a Vernier signal.

FIG. 7D is a graph showing first and second relative position signals and a Vernier signal.

FIG. 15A is a graph showing a synchronism synchronization error and an absolute position reliability determination criterion in a derived form of the second embodiment.

FIG. 15B is a graph showing a synchronism synchronization error and an absolute position reliability determination criterion in a derived form of the second embodiment.

FIG. 16A is a graph showing a synchronism synchronization error and an absolute position reliability determination criterion in a derived form of the second embodiment.

FIG. 16B is a graph showing a synchronism synchronization error and an absolute position reliability determination criterion in a derived form of the second embodiment.

DESCRIPTION OF THE EMBODIMENTS

In the following, exemplary embodiments of the present invention are described in detail with reference to the accompanying drawings.

First Embodiment

In the following, a position detecting apparatus according to a first embodiment of the present invention is described with reference to FIGS. 1 to 10B.

Figure 1:
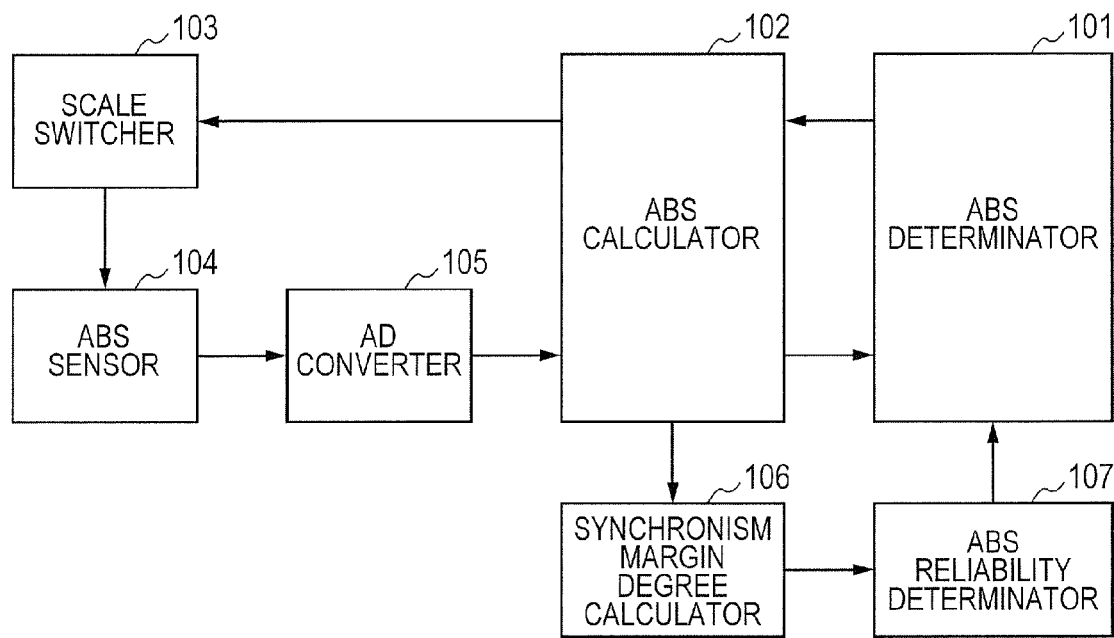
FIG. 1 is a configuration block diagram according to a first embodiment of the present invention.

FIG. 1 is a configuration block diagram of the position detecting apparatus according to the first embodiment of the present invention. In FIG. 1, an ABS calculator 102 is a calculator for calculating an absolute position Pabs which is a displacement amount of a movable member with respect to a fixed member (that is, with respect to a predetermined reference position) based on a signal output from an ABS sensor 104. A scale switcher (switching unit) 103 is a scale switcher for switching two types of signal outputs generated based on two types of track patterns and sequentially outputting the switched signal outputs from the ABS sensor 104. The ABS sensor (obtaining unit) 104 is an absolute position sensor for outputting a signal for calculating an absolute position of the movable member in its movement direction with respect to the fixed member. An internal configuration and the output signals of the ABS sensor 104 are described later. An AD converter 105 is an AD converter for converting an analog signal output from the ABS sensor 104 into a digital signal.

A synchronism margin degree calculator (a synchronization error calculator, a synchronization error computing unit) 106 calculates a synchronism margin degree (synchronization error) that is a parameter representing the validity of synchronism in synchronism calculation processing performed in the ABS calculator 102. An ABS reliability determinator (determining unit) 107 determines the reliability of the absolute position Pabs calculated by the ABS calculator 102 based on the synchronism margin degree calculated by the synchronism margin degree calculator 106. The synchronism calculation processing by synchronous operator (calculator) and the synchronism margin degree are described later in detail.

An ABS determinator 101 is an absolute position determinator for requesting the ABS calculator 102 to calculate an absolute position and for determining whether or not the absolute position Pabs calculated by the ABS calculator 102 is defined as a final absolute position based on the determination result of the ABS reliability determinator 107.

The ABS determinator 101, the ABS calculator 102, the synchronism margin degree calculator 106, and the ABS reliability determinator 107 may be configured in a single CPU or may be configured in a plurality of CPUs.

Next, the internal configuration and the output signals of the ABS sensor 104 are described below.

Figure 2:
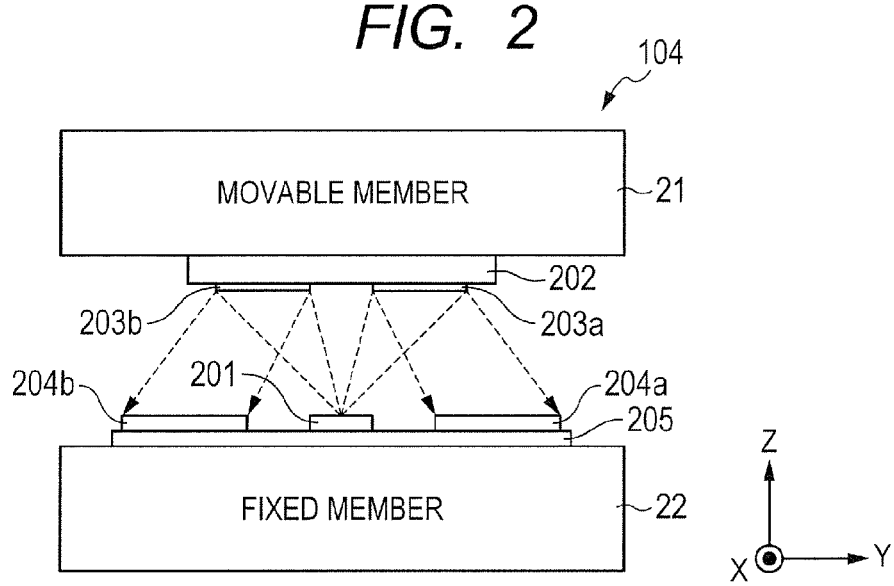
FIG. 2 is a sectional view of an ABS sensor.

FIG. 2 is a sectional view of the ABS sensor 104. In FIG. 2, a movable member 21 is a movable portion capable of moving in an X-axis direction which is vertical to a paper plane. A fixed member 22 is a member which serves as a reference of the absolute position of the movable member 21. A light source 201 is a light emitting unit, and is, for example, an LED. A scale unit 202 is a scale unit including two track patterns 203a and 203b having different numbers of slits provided at equal intervals over a total length. A light receiver 204a is a light receiver for receiving light which is emitted from the light source 201 and reflected by the track pattern 203a. Similarly, a light receiver 204b is a light receiver for receiving light which is emitted from the light source 201 and reflected by the track pattern 203b. The light receivers 204a and 204b are, for example, photodiode arrays. A signal processing circuit 205 is a signal processing circuit for processing the signals of the light received by the light receivers 204a and 204b and for outputting any of the signals of the track patterns 203a and 203b in accordance with a switch-over signal from the scale switcher 103. In this embodiment, the configuration in which the scale unit 202 is provided to the movable member 21 and the light source 201 and the light receivers 204a and 204b are provided to the fixed member 22 is exemplified. However, it should be understood that the configuration is not limited thereto. The scale unit 202 only needs to be provided to one of the fixed member 21 and the movable member 22, whereas the light source 201 and the light receivers 204a and 204b only need to be provided to the other of the fixed member 21 and the movable member 22. The same also applies to an embodiment described later.

Figure 3:
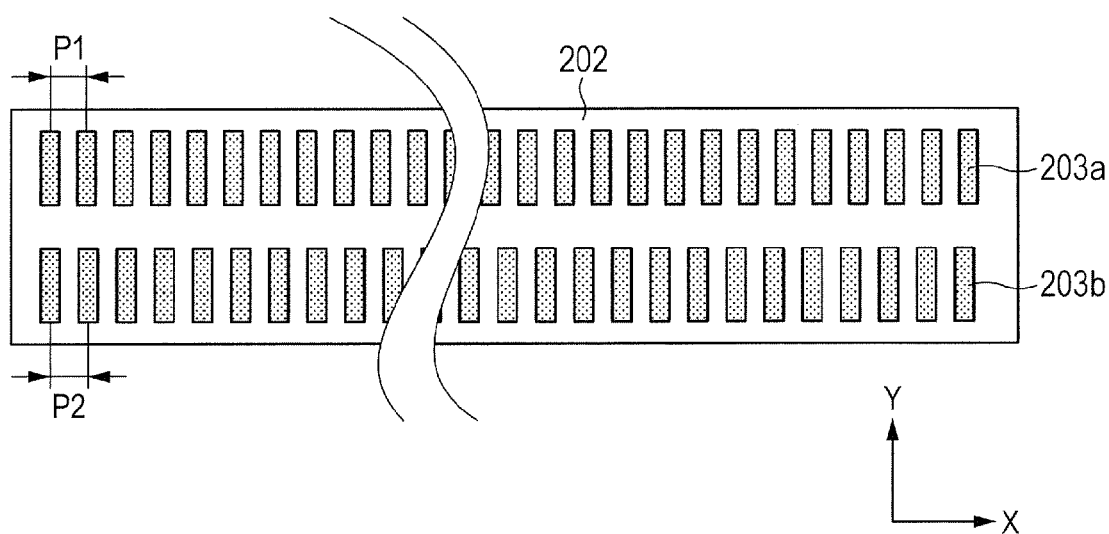
FIG. 3 is a plan view of a scale unit according to the first embodiment.

FIG. 3 is a plan view of the scale unit 202 according to the first embodiment. In FIG. 3, reflective type slit patterns (reflective pattern arrays) are illustrated as an example. The scale unit 202 includes two track patterns, that is, the first track pattern 203a and the second track pattern 203b. The scale unit 202 is configured as follows. When the light emitted from the light source 201 enters reflective portions (black portions) of the track patterns 203a and 203b, the light is reflected to the respective light receivers 204a and 204b. The reflective portions of the first track pattern 203a are formed at equal pitches P1. The reflective portions of the second track pattern 203b are formed at equal pitches P2. In this embodiment, the pitch P1 is determined so that forty reflective portions are formed over a total length Lmax of the scale, that is, to have forty cycles over the total length Lmax. The pitch P2 is determined so that thirty-nine reflective portions are formed over the total length Lmax of the scale, that is, to have thirty-nine cycles over the total length Lmax.

Figure 4:
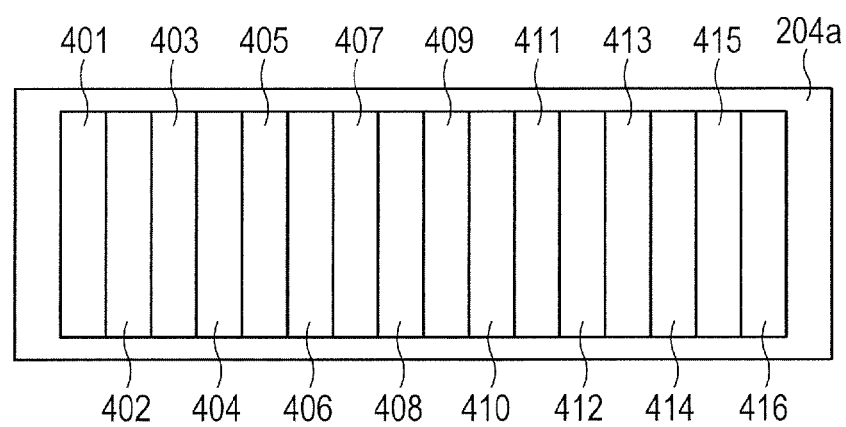
FIG. 4 is a plan view of a light receiver.

FIG. 4 is a plan view of the light receiver 204a. The light receiver 204b has the same configuration as that of the light receiver 204a. Sixteen photodiodes 401 to 416 are arranged on the light receiver 204a at equal intervals in a horizontal direction. The photodiodes 401, 405, 409, and 413 are electrically connected to each other. A group formed by the photodiodes 401, 405, 409, and 413 is referred to as "phase a". A group formed by the photodiodes 402, 406, 410, and 414 is referred to as "phase b". Similarly, a group formed by the photodiodes 403, 407, 411, and 415 is referred to as "phase c", and a group formed by the photodiodes 404, 408, 412, and 416 is referred to as "phase d". This embodiment is described based on the presupposition that a length for four photodiodes included in the light receiver 204a in a direction of arrangement of the photodiodes (for example, a distance from an end of the photodiode 401 to an end of the photodiode 404) is twice as large as the pitch P1 of the reflective portions of the first track pattern 203a. An optical path length of light which is emitted from the light source 201 to the light receiver 204a becomes twice as large as an optical path length of light which is emitted from the light source 201 and reflected by the reflective portions of the first track pattern 203a. Therefore, a width of the reflected light received by the light receiver 204a is twice as large as the width at the reflective portion. Therefore, the width for the four photodiodes included in the light receiver 204a in an X direction corresponds to one cycle of the pattern of the first track pattern 203a.

When the light from the light source 201, which is reflected by the first track pattern 203a, is received by the light receiver 204a, the phase-a, phase-b, phase-c, and phase-d photodiode groups respectively output photo-electric currents corresponding to the received light amounts. With the movement of the scale unit 202 in the X-axis direction, the phase-a, phase-b, phase-c, and phase-d photodiode groups output the currents (periodic signals) fluctuating in the following phase relationships. Specifically, with respect to the current in the phase a as a reference, the current fluctuates at 90° for the phase b, at 180° for the phase c, and at 270° for the phase d. The signal processing circuit 205 converts the output currents into voltages by a current-voltage converter. Next, the signal processing circuit 205 obtains a differential component between the phase a and the phase c and a differential component between the phase b and the phase d by a differential amplifier. Next, the signal processing circuit 205 generates, from the differential component between the phase a and the phase c and the differential component between the phase b and the phase d, a first A-phase displacement signal S1rA which is a A-phase displacement signal of the first track pattern 203a and a first B-phase displacement signal S1rB which is a B-phase displacement signal thereof whose phase is shifted by 90° from the phase of the first A-phase displacement signal S1rA. In a similar manner, for the light received by the light receiver 204b, a second A-phase displacement signal S2rA and a second B-phase displacement signal S2rB which are respectively an A-phase displacement signal and a B-phase displacement signal of the second track pattern 203b are also generated.

The signal processing circuit 205 outputs any one of a set of the first A-phase displacement signal S1rA and the first B-phase displacement signal S1rB and a set of the second A-phase displacement signal S2rA and the second B-phase displacement signal S2rB in accordance with a switch-over signal from the scale switcher 103.

As described above, the ABS sensor 104 outputs any one of the set of the first A-phase displacement signal S1rA and the first B-phase displacement signal S1rB and the set of the second A-phase displacement signal S2rA and the second B-phase displacement signal S2rB in accordance with the switch-over signal from the scale switcher 103.

Figure 5:
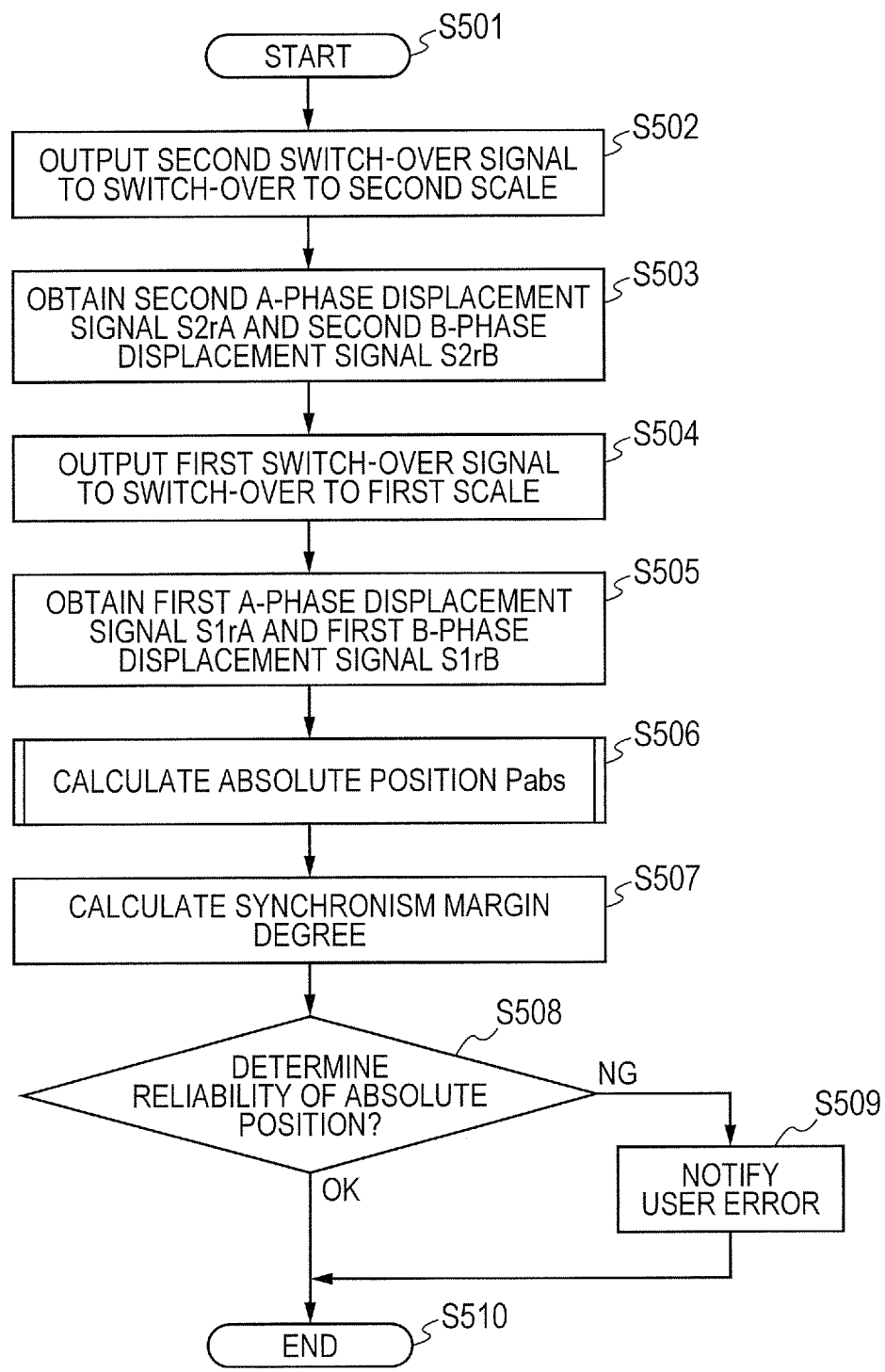
FIG. 5 is a flowchart of signal obtaining according to the first embodiment.
Figure 6:
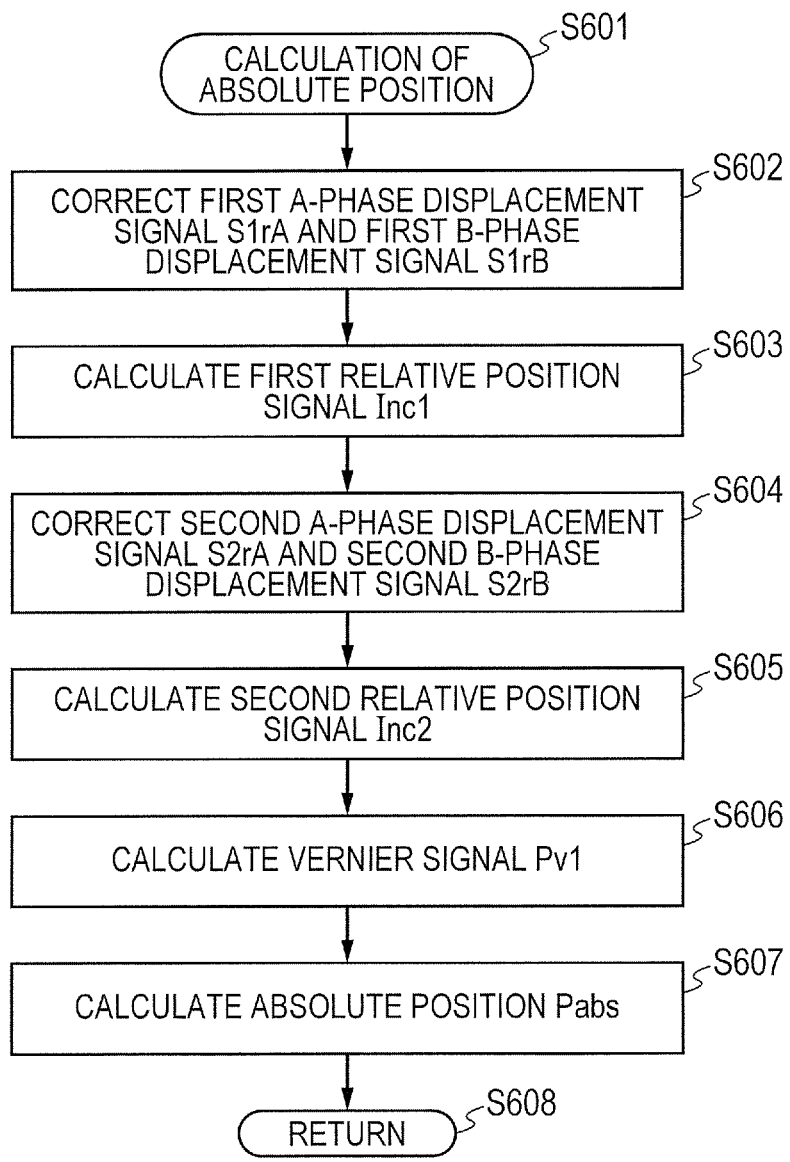
FIG. 6 is a flowchart of absolute position calculation.

Next, an operation of the first embodiment is described with reference to FIGS. 5 and 6. FIG. 5 illustrates an operation flow of the first embodiment.

In Step S501, processing starts and then proceeds to Step S502. Processing for determining the absolute position Pabs is started by a request for calculating the absolute position Pabs issued by the ABS determinator 101 to the ABS calculator 102.

In Step S502, the ABS calculator 102 outputs a second switch-over signal for switching over to a second scale to the scale switcher 103. Then, the processing proceeds to Step S503. Based on the second switch-over signal, the scale switcher 103 instructs the ABS sensor 104 to output the signals of the second track pattern. Then, the ABS sensor 104 outputs the signals S2rA and S2rB of the second track pattern. The signals S2rA and S2rB of the second track pattern are converted into digital signals by the AD converter 105 and are then output to the ABS calculator 102.

In Step S503, a signal level V1s2rA of the second A-phase displacement signal S2rA and a signal level V1s2rB of the second B-Phase displacement signal S2rB at an execution timing T1 of Step S503, which are output from the AD converter 105, are obtained. Then, the processing proceeds to Step S504.

In Step S504, the ABS calculator 102 outputs a first switch-over signal for switching over to a first scale to the scale switcher 103. Then, the processing proceeds to Step S505. Based on the first switch-over signal, the scale switcher 103 instructs the ABS sensor 104 to output the signals of the first track pattern. Then, the ABS sensor 104 outputs the signals S1rA and S1rB of the first track pattern. The signals S1rA and S1rB of the first track pattern are converted into digital signals by the AD converter 105 and are then output to the ABS calculator 102.

In Step S505, a signal level V2s1rA of the first A-phase displacement signal S1rA and a signal level V2s1rB of the first B-Phase displacement signal S1rB at an execution timing T2 of Step S505, which are output from the AD converter 105, are obtained. Then, the processing proceeds to Step S506.

In Step S506, the absolute position Pabs is calculated based on the signals of the respective track patterns, which are obtained in Steps S503 and S505. Then, the processing proceeds to Step S507. A method of calculating the absolute position is described later.

In Step S507, the synchronism margin degree that is a parameter representing the validity of synchronism is calculated in the synchronism calculation processing performed in the absolute position Pabs calculation processing of Step S506. Then, the processing proceeds to Step S508. The synchronism calculation processing and the synchronism margin degree are described later in detail.

In Step S508, the reliability of the absolute position Pabs calculated in Step S506 is determined based on the synchronism margin degree calculated in Step S507. In the case where it is determined that the absolute position Pabs is reliable, the processing proceeds to Step S510. On the contrary, in the case where it is determined that the absolute position Pabs is not reliable, the processing proceeds to Step S509. The reliability determination method is described later in detail.

In Step S509, an error notification unit (notification unit) (not shown) such as an LED notifies the user of an error. Then, the processing proceeds to Step S510.

In Step S510, the processing ends, and the ABS determinator 101 determines the absolute position Pabs calculated by the ABS calculator 102 as an absolute position of the movable member 21. By the processing described above, the absolute position of the movable member is determined.

Next, the method of calculating the absolute position is described. The absolute position is calculated by the ABS calculator 102. FIG. 6 illustrates a flow of the absolute position calculation.

In Step S601, the processing starts. Then, the processing proceeds to Step S602.

In Step S602, the signal level V2s1rA of the first A-phase displacement signal S1rA and the signal level V2s1rB of the first B-phase displacement signal S1rB at the execution timing T1, which are obtained in Step S505 illustrated in FIG. 5, are corrected.

The first A-phase displacement signal S1rA and the first B-phase displacement signal S1rB have different signal offsets or signal amplitudes in some cases. If the signals having different signal offsets or signal amplitudes are directly used for the absolute position calculation, an error may be generated in the calculated absolute position Pabs. Therefore, the signals are required to be corrected.

In this embodiment, as described above, the length for the four photodiodes included in the light receiver 204a in the direction of arrangement of the photodiodes (for example, the distance from the end of the photodiode 401 to the end of the photodiode 404) is twice as large as the pitch P1 of the reflective portions of the first track pattern 203a. Therefore, the first A-phase displacement signal S1rA and the first B-phase displacement signal S1rB are respectively expressed as Expressions (1) and (2) below.

$$S1rA: a1 \times \cos\theta + s1 \qquad (1)$$

$$S1rB: a2 \times \sin\theta + s2 \qquad (2)$$

In Expressions (1) and (2), symbol a1 is an amplitude of the first A-phase displacement signal S1rA and symbol s1 is an offset of the first A-phase displacement signal, symbol a2 is an amplitude of the first B-phase displacement signal S1rB and symbol s2 is an offset of the first B-phase displacement signal, and symbol θ is a phase of the signal. The first A-phase displacement signal S1rA has a maximum value of s1+a1, a minimum value of s1−a1, the signal amplitude of a1, and an average value of s1. Similarly, the second B-phase displacement signal S1rB has a maximum value of s2+a2, a minimum value of s2−a2, the signal amplitude of a2, and an average value of s2. By using the values described above, the first A-phase displacement signal S1rA and the first B-phase displacement signal S1rB respectively expressed by Expressions (1) and (2) are corrected. Then, a corrected first A-phase displacement signal S1cA and a corrected first B-phase displacement signal S1cB are expressed as Expressions (3) and (4) below.

$$S1cA: \{(a1 \times \cos\theta + s1) - s1\} \times a2 = a1 \times a2 \times \cos\theta \qquad (3)$$

$$S1cB: \{(a2 \times \sin\theta + s2) - s2\} \times a1 = a1 \times a2 \times \sin\theta \qquad (4)$$

As a result, the offsets of the first A-phase displacement signal S1rA and the first B-phase displacement signal S1rB are removed to obtain the first A-phase displacement signal S1cA and the first B-phase displacement signal S1cB having the same signal amplitude.

After the first A-phase displacement signal S1rA and the first B-phase displacement signal S1rB are corrected in Step S602 by the processing described above, the processing proceeds to Step S603.

In Step S603, by using the corrected first A-phase displacement signal S1cA and the corrected first B-phase displacement signal S1cB, a first relative position signal Inc1 having forty cycles over the total length of the scale and a wave height Vmax as shown in FIG. 7B is calculated. Then, the processing proceeds to Step S604. The horizontal axis of FIGS. 7A to 7D indicates the position on the total length Lmax of the scale, whereas the vertical axis indicates a signal level at the position.

First, by using the corrected first A-phase displacement signal S1cA and the corrected first B-phase displacement signal S1cB, an arctangent calculation is performed to calculate a signal Atan1 as shown in FIG. 7A. The first track pattern 203a is a pattern which has forty cycles over the total length Lmax of the scale. Therefore, the signal Atan1 has eighty cycles over the total length of the scale.

Next, the first relative position signal Inc1 having forty cycles over the total length of the scale and the wave height Vmax is calculated from the signal Atan1. Specifically, a gain is applied to the signal Atan1 so that the wave height of the signal Atan1 becomes Vmax/2. The signal level is offset so that the signal level becomes 0 when the phase of the first B-phase displacement signal S1rB is at 0°. Then, by adding Vmax/2 when the phase is in the range from 180° to 360°, the first relative position signal Inc1 is calculated. Therefore, the first relative position signal Inc1 becomes a saw tooth wave having forty cycles over the total length Lmax of the scale, as shown in FIG. 7B. Accordingly, the first relative position signal Inc1 corresponding to the phase of the first track pattern 203a having the pitch P1 in one-by-one fashion is calculated by the ABS calculator 102 (phase calculator).

In Steps S602 and S603 described above, a signal level V2inc1 of the first relative position signal Inc1 at the execution timing T2 is calculated from the signal level V2s1rA of the first A-phase displacement signal S1rA and the signal level V2s1rB of the first B-phase displacement signal S1rB at the execution timing T2. Then, the processing proceeds to Step S604.

In Step S604, the signal level V1s2rA of the second A-phase displacement signal S2rA and the signal level V1s2rB of the second B-phase displacement signal S2rB at the execution timing T1, which are obtained in Step S503 illustrated in FIG. 5, are corrected.

The light receiver 204b has the same configuration as the light receiver 204a. Therefore, the length for four photodiodes included in the light receiver 204b in the direction of arrangement of the photodiodes (for example, the distance from the end of the photodiode 401 to the end of the photodiode 404) is twice as large as the pitch P1 of the reflective portions of the first track pattern 203a. The pitch P1 of the reflective portions of the first track pattern 203a and the pitch P2 of the reflective portions of the second track pattern 203b are different from each other. Therefore, the length for four photodiodes included in the light receiver 204b in the direction of arrangement of the photodiodes (for example, the distance from the end of the photodiode 401 to the end of the photodiode 404) does not become twice as large as the pitch P2 of the reflective portions of the second track pattern 203b. Therefore, the second A-phase displacement signal S2rA and the second B-phase displacement signal S2rB have a relationship in which the phase shift therebetween is not 90°.

Thus, the second A-phase displacement signal S2rA and the second B-phase displacement signal S2rB are respectively expressed by Expressions (5) and (6) below.

$$S2rA: b1 \times \cos\theta + t1 \qquad (5)$$

$$S2rB: b2 \times \sin(\theta + \alpha) + t2 \qquad (6)$$

In Expressions (5) and (6), symbol b1 is an amplitude of the second A-phase displacement signal S2rA and symbol t1 is an offset of the second A-phase displacement signal S2rA, symbol b2 is an amplitude of the second B-phase displacement signal S2rB and symbol t2 is an offset of the second B-phase displacement signal S2rB, symbol θ is a phase of the signal, and symbol α is a shift amount of the phase. When the second A-phase displacement signal S2rA and the second B-phase displacement signal S2rB are corrected in the same manner as in the processing performed in Step S602, a corrected second A-phase displacement signal S2cA' and a corrected second B-phase displacement signal S2cB' are expressed by Expressions (7) and (8) below.

$$S2cA':\{(b1\times\cos\theta+t1)-t1\}\times b2=b1\times b2\times\cos\theta \quad (7)$$

$$S2cB':\{(b2\times\sin(\theta+\alpha)+t2)-t2\}\times b1=b1\times b2\times\sin(\theta+\alpha) \quad (8)$$

As a result, the offset t1 of the second A-phase displacement signal S2rA and the offset t2 of the second B-phase displacement signal S2rB are removed to obtain the second A-phase displacement signal S2cA' and the second B-phase displacement signal S2cB' having the same signal amplitude.

Next, processing for setting a phase difference between the second A-phase displacement signal S2cA' and the second B-phase displacement signal S2cB' to 90° by using Expressions (7) and (8) is described below.

A difference between Expressions (7) and (8) and the sum of Expressions (7) and (8) are respectively expressed by Expressions (9) and (10) below.

$$b1\times b2\times(\sin(\theta+\alpha)-\cos\theta)= \quad (9)$$
$$b1\times b2\times 2\times\sin\{(\alpha-90)/2\}\times\cos\{\theta+(\alpha+90)/2\}$$

$$b1\times b2\times(\sin(\theta+\alpha)+\cos\theta)= \quad (10)$$
$$b1\times b2\times 2\times\sin\{(\alpha-90)/2\}\times\sin\{\theta+(\alpha+90)/2\}$$

The phase difference given by Expressions (9) and (10) becomes 90° by the calculations described above.

The amplitudes in Expressions (9) and (10) are different from each other. Therefore, the amplitudes are next corrected to calculate a second A-phase displacement signal S2cA and a second B-phase displacement signal S2cB having the same signal amplitude. Expression (9) is multiplied by cos $\{(\alpha-90)/2\}$ which is a part of the amplitude in Expression (10), and Expression (10) is multiplied by sin $\{(\alpha-90)/2\}$ which is a part of the amplitude in Expression (9). Then, Expressions (11) and (12) are obtained.

second A-phase displacement signal S2cA:

$$b1\times b2\times 2\times\sin\{(\alpha-90)/2\}\times\cos\{(\alpha-90)/2\}\times\cos\{\theta+(\alpha+90)/2\} \quad (11)$$

second B-phase displacement signal S2cB:

$$b1\times b2\times 2\times\sin\{(\alpha-90)/2\}\times\cos\{(\alpha-90)/2\}\times\sin\{\theta+(\alpha+90)/2\} \quad (12)$$

As a result, the offsets of the second A-phase displacement signal S2rA and the second B-phase displacement signal S2rB are removed so that the second A-phase displacement signal S2cA and the second B-phase displacement signal S2cB having the same signal amplitude and the phase difference of 90° are obtained.

After the second A-phase displacement signal S2rA and the second B-phase displacement signal S2rB are corrected in Step S604 by the processing described above, the processing proceeds to Step S605.

In Step S605, the same calculation as that performed in Step S603 is performed using the corrected second A-phase displacement signal S2cA and the corrected second B-phase displacement signal S2cB to calculate a second relative position signal Inc2. The second track pattern 203b is a pattern having thirty-nine cycles over the total length Lmax of the scale. Therefore, the second relative position signal Inc2 becomes a saw tooth wave having thirty-nine cycles over the total length Lmax of the scale, as shown in FIG. 7C. Accordingly, the second relative position signal Inc2 corresponding to the phase of the second track pattern 203b having the pitch P2 in one-by-one fashion is calculated by the ABS calculator 102 (phase calculator). The horizontal axis of FIGS. 7A to 7D indicates the position on the total length Lmax of the scale, whereas the vertical axis indicates the signal level at the position.

By the processing in Steps S604 and S605 described above, a signal level V1inc2 of the second relative position signal Inc2 at the timing T1 is calculated from the signal level V1s2rA of the second A-phase displacement signal S2rA and the signal level V1s2rB of the second B-phase displacement signal S2rB at the timing T1. Then, the processing proceeds to Step S606.

In Step S606, a Vernier signal Pv1 as shown in FIG. 7D is calculated based on the signal level V1inc2 of the second relative position signal Inc2 at the timing T1 and the signal level V2inc1 of the first relative position signal Inc1 at the timing T2. The Vernier signal Pv1 is obtained by performing calculation in which a difference between the first relative position signal Inc1 and the second relative position signal Inc2 is calculated, and in the case where the difference is a negative value, Vmax is added.

In this case, a difference in the number of cycles between the first relative position signal Inc1 and the second relative position signal Inc2 over the total length Lmax is 1. Therefore, the Vernier signal Pv1 becomes a saw tooth wave having one cycle over the total length Lmax.

After the Vernier signal Pv1 is calculated in Step S606, the processing proceeds to Step S607.

In Step S607, the absolute position Pabs is calculated.

Subsequently, a method of calculating the absolute position Pabs is described.

The signals S1rA, S1rB, S2rA, and S2rB each contain a noise component due to a disturbance and the like. Therefore, the relative position signals Inc1 and Inc2 calculated from the above-mentioned signals also contain a noise component. In order to correct an error component E in the signals, a synchronism calculation of the Vernier signal Pv1 and the first relative position signal Inc1 is performed. The synchronism calculation is described later. The details of the error component E are described later together with the description of the effects of the movement amount correction.

The synchronism calculation is performed to calculate a signal, as a signal Vabs indicating the absolute position, by synthesizing the Vernier signal Pv1 which is an upper-level signal and the first relative position signal Inc1 which is a lower-level signal. The absolute position Pabs is calculated from the signal Vabs. A method of calculating the absolute position Pabs from the signal Vabs is described later.

Next, the synchronism calculation is described.

FIGS. 8A to 8D show how the waveforms change by the synchronism calculation described above.

In FIGS. 8A to 8D, the horizontal axis indicates the position on the total length Lmax of the scale, whereas the vertical axis indicates the signal level at the position on the total length Lmax. In addition, symbol Vmax indicates the maximum value of the signal level, and symbol N1 indicates a cycle number of a region from a start point of the scale. The number of cycles over the total length Lmax (maximum N1) is defined as N1max. In this embodiment, the first track pattern 203a has forty cycles over the total length Lmax of the scale. Therefore, N1max is 40, where N1 is a natural number ranging from 1 to 40.

Figure 8A:
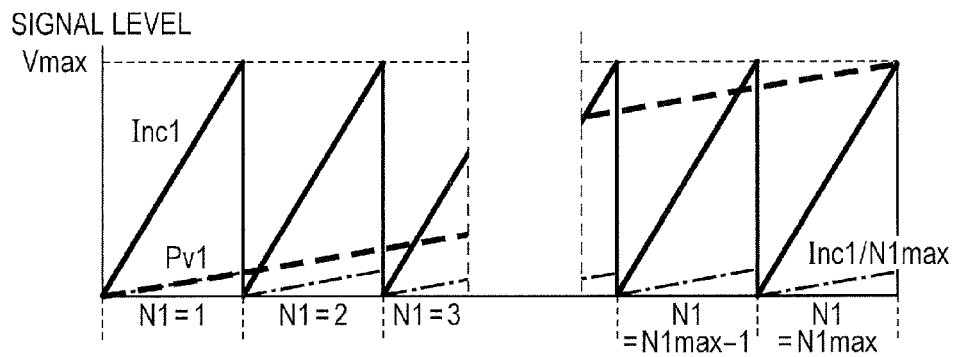
FIG. 8A is a graph showing a waveform change in synchronism calculation.
Figure 8B:
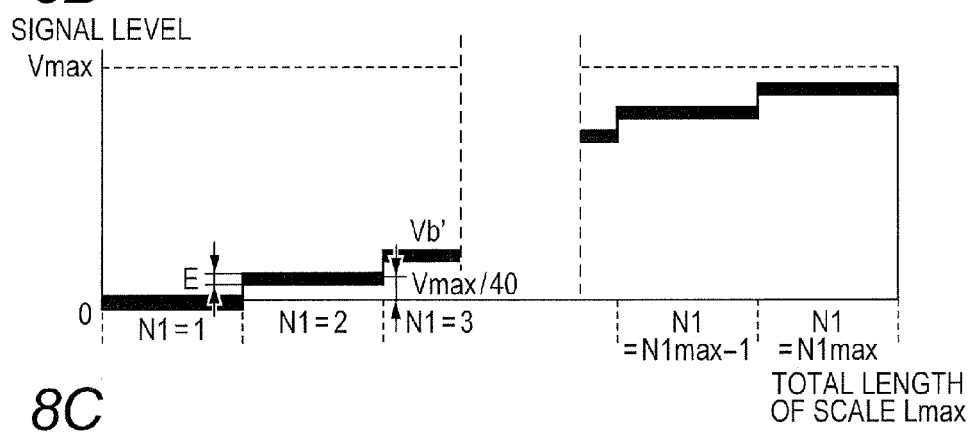
FIG. 8B is a graph showing a waveform change in synchronism calculation.

FIG. 8A shows waveforms of Inc1, Pv1, and Inc1/N1max. When a difference between Pv1 and Inc1/N1max having the same gradient as Pv1 is taken, a step-like waveform containing the error component E shown in FIG. 8B is generated. A signal Vb' having the waveform shown in FIG. 8B is expressed by Expression (13). A signal level for one step of the step-like waveform is Vmax/N1max.

$$Vb'=Pv1-(Inc1/N1\max) \quad (13)$$

Figure 8C:
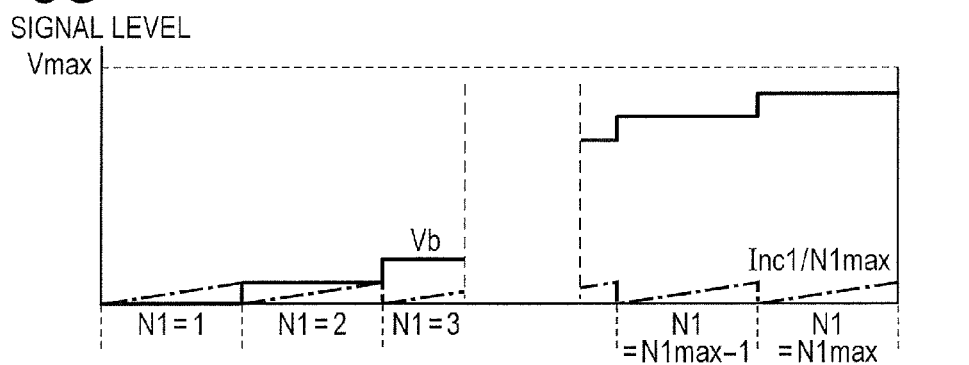
FIG. 8C is a graph showing a waveform change in synchronism calculation.

Next, the error component E of the waveform shown in FIG. 8B is removed by rounding. Then, a waveform shown in FIG. 8C is obtained. A signal Vb having the waveform shown in FIG. 8C is expressed by Expression (14).

$$Vb=\text{Round}[Vb'\times(N1\max/V\max)]\times(V\max/N1\max) \quad (14)$$

where Round[ ] is a function for rounding off the first decimal place.

The error component E can be expressed by Expression (15).

$$E=Vb'-Vb \quad (15)$$

Figure 8D:
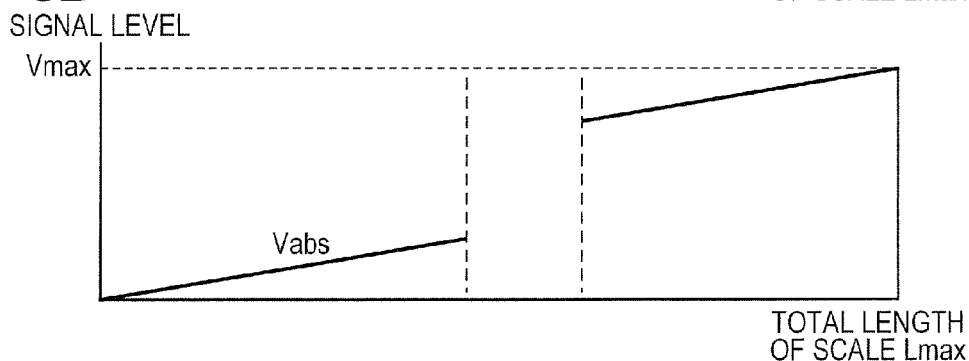
FIG. 8D is a graph showing a waveform change in synchronism calculation.

The waveform of Inc1/N1max is added to the waveform of the signal Vb shown in FIG. 8C to generate the signal Vabs indicating the absolute position obtained by removing the error component E, as shown in FIG. 8D.

The synchronism calculation is performed by a calculation expressed by Expression (16).

$$Vabs=Vb+(Inc1/N1\max) \quad (16)$$

From the signal Vabs indicating the absolute position, the absolute position Pabs is expressed by Expression (17).

$$Pabs=Vabs\times(L\max/V\max) \quad (17)$$

By the processing of Step S607 described above, the absolute position Pabs at the timing T2 is calculated from the Vernier signal Pv1 and the signal level V2inc1 of the first relative position signal Inc1 at the timing T2. Then, the processing proceeds to S608 where the processing ends.

By the processing described above, the absolute position Pabs can be calculated.

Next, the synchronism margin degree calculation is described in detail with reference to FIGS. 9A and 9B.

Figure 9A:
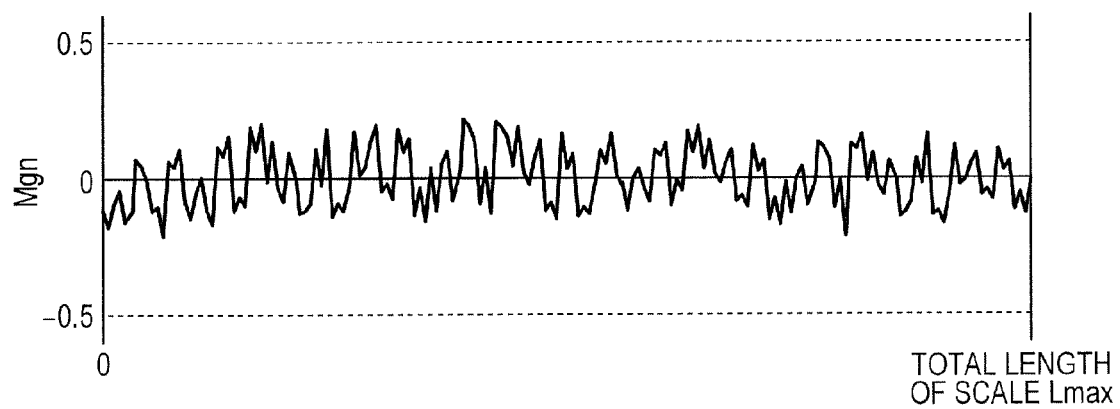
FIG. 9A is a graph showing a synchronism synchronization error in the first embodiment.
Figure 9B:
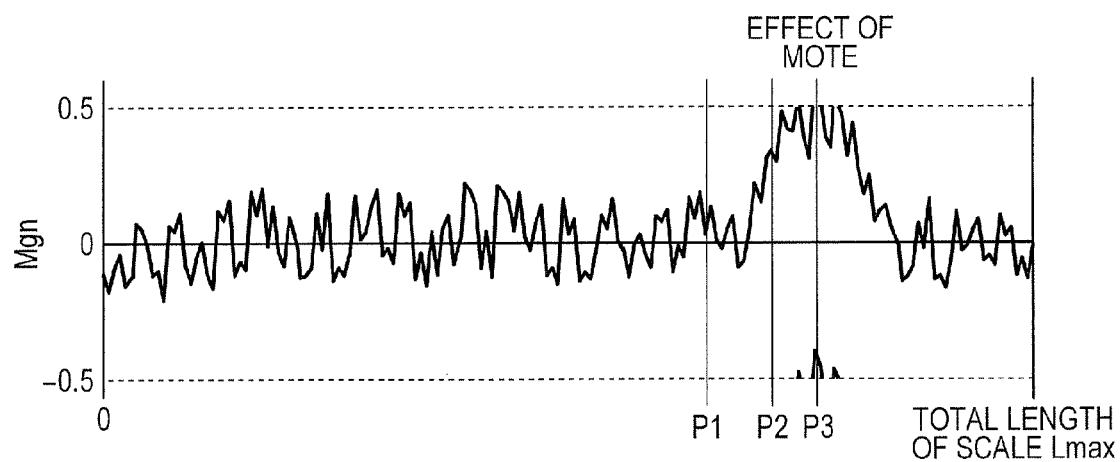
FIG. 9B is a graph showing a synchronism synchronization error in the first embodiment.

FIG. 9A is a graph showing a synchronism margin degree Mgn in a normal case, and the synchronism margin degree Mgn can be expressed by Expression (18).

$$Mgn=(Vb'\times(N1\max/V\max))-\text{Round}[Vb'\times(N1\max/V\max)] \quad (18)$$

That is, the synchronism margin degree Mgn is a decimal portion to be rounded in the round-off function Round[ ] performed in Expression (14), and can also be expressed by Expression (19) using the error component E.

$$Mgn=E\times(N1\max/V\max) \quad (19)$$

It can be determined that the error component E is smaller as the synchronism margin degree Mgn becomes closer to 0, and the absolute position Pabs is calculated correctly. On the other hand, in the case where an error is caused by the effect of motes, the synchronism margin degree changes as shown in FIG. 9B. At a position P1 without effect of motes, the same synchronism margin degree Mgn as that in the normal case is obtained. At a position P2 under the effect of motes, the synchronism margin degree Mgn is degraded to be close to 0.5.

Further, when the synchronism margin degree Mgn becomes more than 0.5 as in a position P3 under the effect of motes, the synchronism margin degree Mgn is converted into an adjacent value in rounding-off in synchronism calculation to become closer to −0.5. That is, when the phenomenon in which the synchronism margin degree Mgn changes between 0.5 and −0.5 with respect to the position in scale occurs, the synchronism calculation fails, and an absolute position is detected erroneously.

Figure 10A:
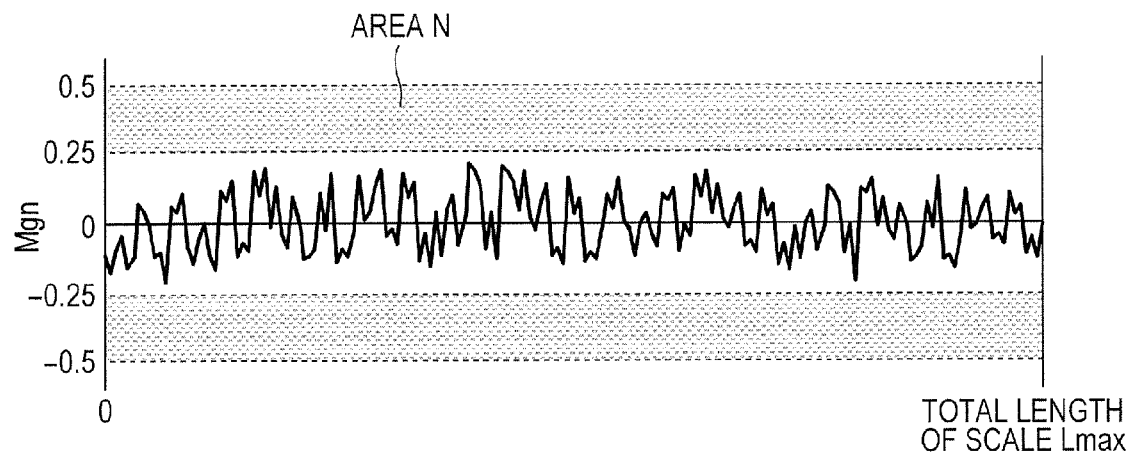
FIG. 10A is a graph showing an absolute position reliability determination criterion in the first embodiment.
Figure 10B:
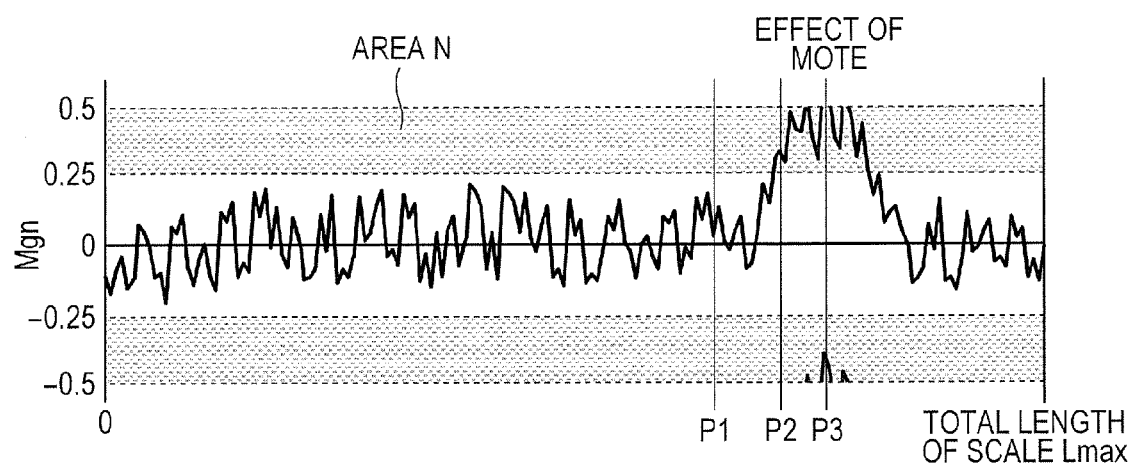
FIG. 10B is a graph showing an absolute position reliability determination criterion in the first embodiment.

Subsequently, a method of determining the reliability of an absolute position by using the calculated synchronism margin degree Mgn is described with reference to FIGS. 10A and 10B. FIGS. 10A and 10B are graphs showing the cases of FIGS. 9A and 9B, respectively.

In this embodiment, a threshold value of the synchronism margin degree Mgn is defined as 0.25 that is a design guarantee value of the position detecting apparatus of this embodiment. In the case where the synchronism margin degree Mgn is within ±0.25, it is determined that the absolute position is reliable, and otherwise it is determined that the absolute position is not reliable. That is, an area N in gray in FIGS. 10A and 10B corresponds to a region in which it is determined that the absolute position is not reliable.

As shown in FIG. 10A, the synchronism margin degree Mgn does not fall within the area N in the normal case, and hence it is determined that the absolute position is reliable over the entire region. In FIG. 10B, at positions (including P2 and P3) where the synchronism margin degree Mgn is degraded due to the effect of motes, the synchronism margin degree Mgn falls within the area N. In particular, at positions (including P3) where the synchronism calculation fails due to the effect of motes and the absolute position is detected erroneously, that is, in an area in which the synchronism margin degree Mgn is more than 0.5 and close to −0.5, the synchronism margin degree Mgn falls within the area N completely, and it is determined that the absolute position is not reliable.

That is, it can be determined that the absolute position is not reliable in the form including the area in which the absolute position is detected erroneously.

With this, whether or not the area is the one in which the absolute position is reliable is calculated based on only the obtained signal required for the synchronism calculation, and the user can be notified of an error in the case where the absolute position is not reliable.

Second Embodiment

A second embodiment of the present invention is now described with reference to FIGS. 11 to 16B.

Figure 11:
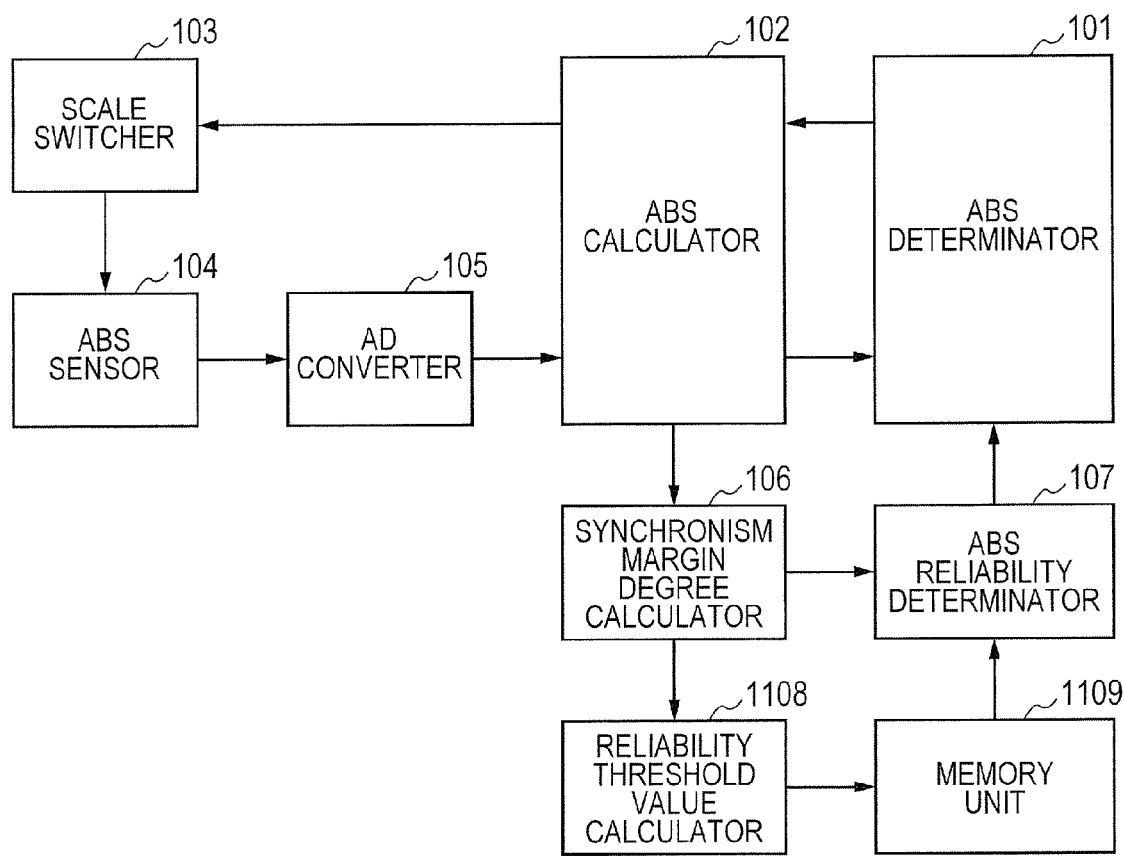
FIG. 11 is a configuration block diagram according to a second embodiment of the present invention.

FIG. 11 is a configuration block diagram of the second embodiment. In FIG. 11, the description of the components having the same configurations as those of the first embodiment is herein omitted.

A reliability threshold value calculator 1108 is a calculator for calculating a threshold value to be used for determining the reliability of an absolute position based on the synchronism margin degree calculated by the synchronism margin degree calculator 106. Further, a memory unit 1109 is a non-volatile memory for storing the threshold value calculated by the reliability threshold value calculator 1108.

Next, an operation of this embodiment is described with reference to FIGS. 12 and 13. An operation flow of this embodiment is the same as the processing flow of the first embodiment illustrated in FIG. 5, and hence the description thereof is omitted. Note that, this embodiment is different from the first embodiment in that the reliability is determined by comparing the synchronism margin degree Mgn calculated in Step S507 with the threshold value calculated in reliability threshold value calculation processing described later in the absolute position reliability determination processing of Step S508.

Next, reliability threshold value optimization processing for optimizing a threshold value for determining the reliability of an absolute position is described with reference to FIG. 12.

Note that, the same processing as that in FIG. 5 is denoted by the same reference numeral, and the description thereof is omitted.

In Step S1201, processing starts and then proceeds to Step S502. Note that, this processing is started by notifying the user of the start of the reliability threshold value optimization processing indicated by a switch (not shown) or the like.

In Step S1208, a threshold value to be used for the absolute position reliability determination processing is updated (reliability threshold value update), and the processing proceeds to Step S1209. Note that, the reliability threshold value update processing is described later in detail.

In Step S1209, it is determined whether or not the user is notified of the completion of the reliability threshold value optimization processing. In the case where the user is notified of the completion, the processing proceeds to Step S1210, and otherwise the processing proceeds to Step S502. Note that, the user is notified of the completion of the reliability threshold value optimization processing by the switch (not shown). In general, the reliability threshold value optimization processing is performed in an entire area by moving a movable member and a fixed member (scale and obtaining unit) in an entire movable area in a movement direction. In this manner, the reliability threshold value can be optimized more accurately.

In Step S1210, the reliability threshold value optimization processing is completed.

Next, a processing flow of the reliability threshold value update performed in Step S1208 in a reliability threshold value optimization routine is described with reference to FIG. 13.

In Step S1301, processing starts and then proceeds to Step S1302.

Figure 12:
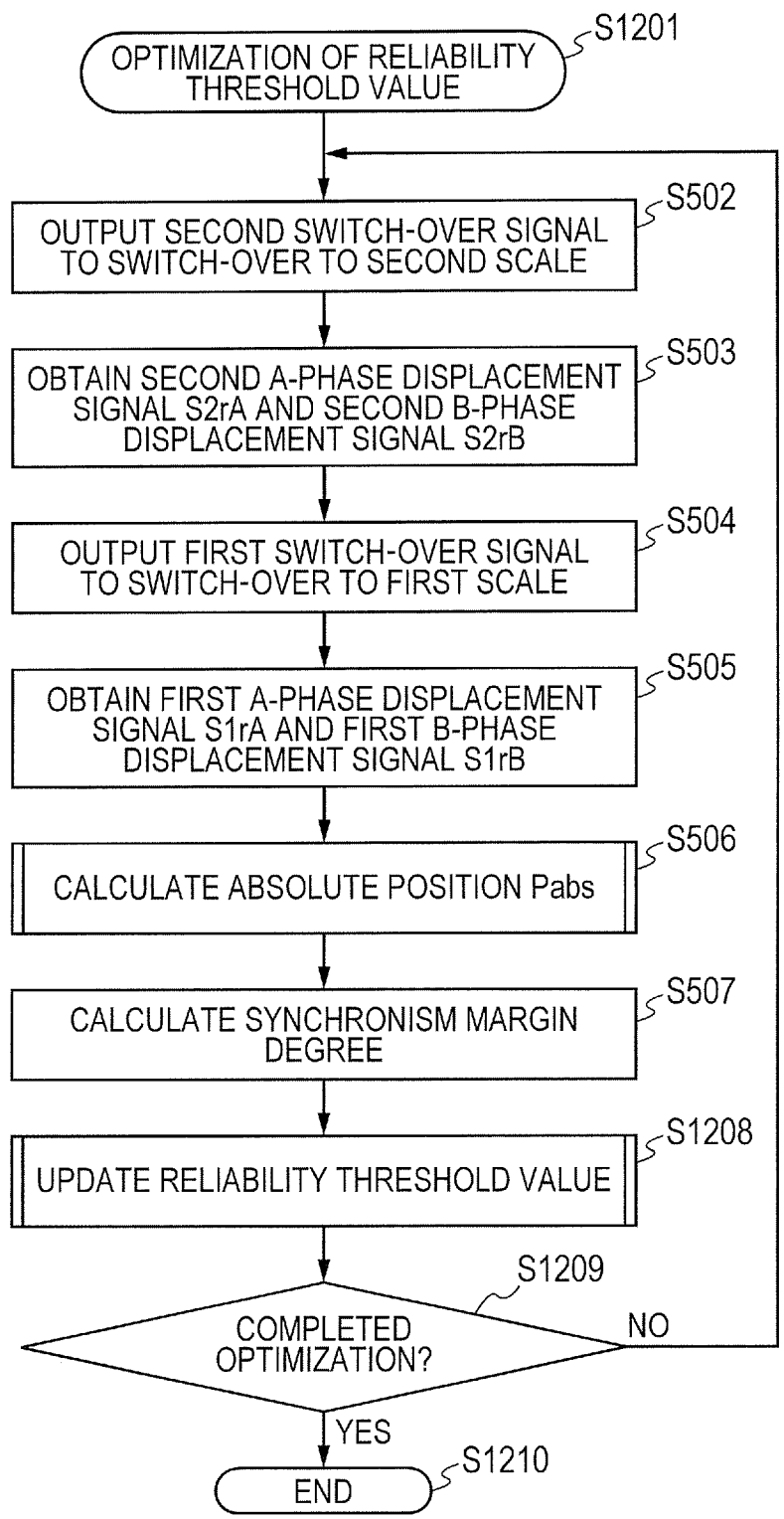
FIG. 12 is a flowchart of reliability threshold value calculation.
Figure 13:
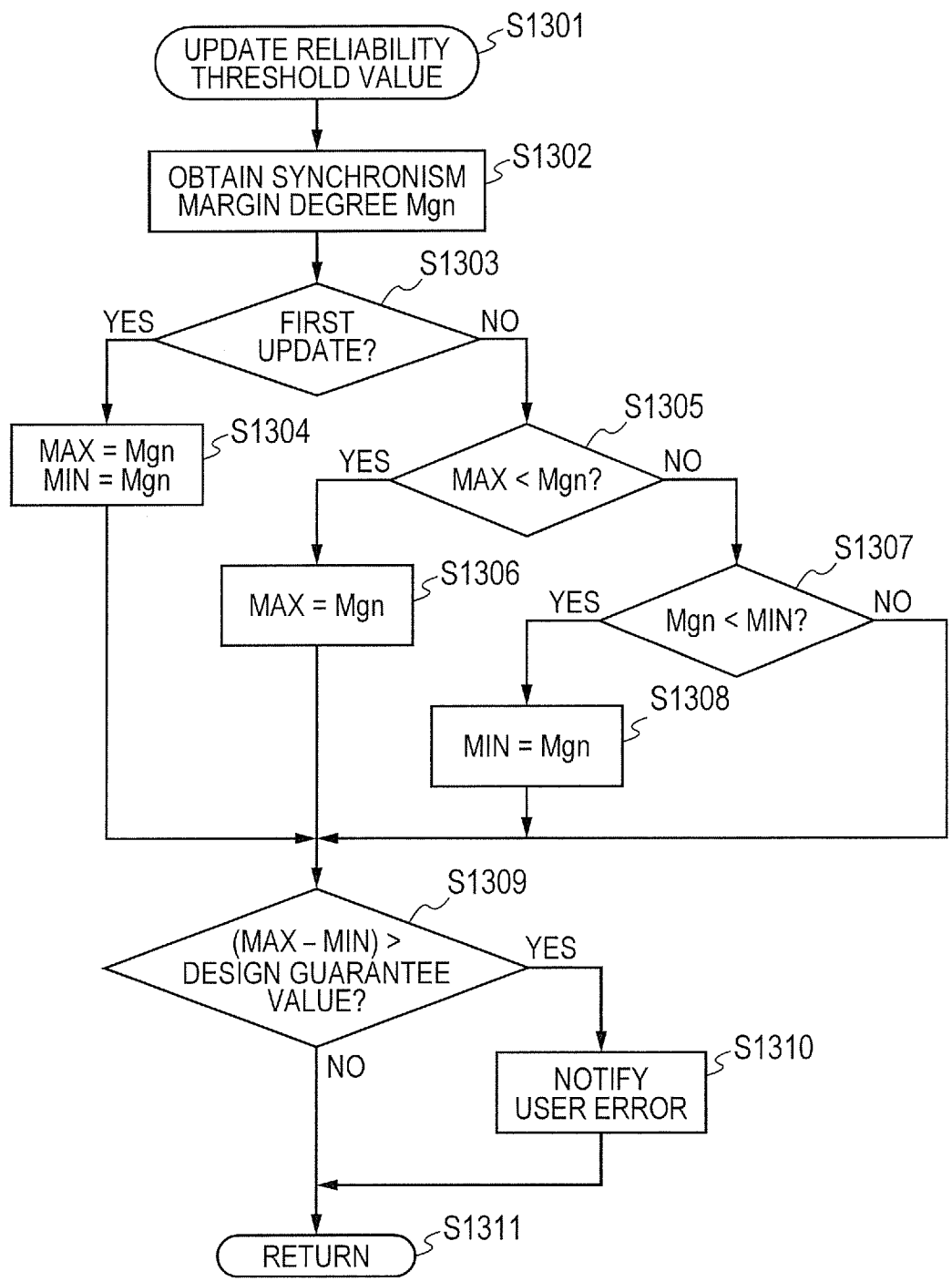
FIG. 13 is a flowchart of reliability threshold value update.

In Step S1302, the synchronism margin degree Mgn calculated in Step S507 of FIG. 12 is obtained, and the processing proceeds to Step S1303.

In Step S1303, it is determined whether or not the reliability threshold value update processing is the first one after the start of the reliability threshold optimization processing. In the case where the reliability threshold value update processing is the first one, the processing proceeds to Step S1304, and otherwise the processing proceeds to Step S1305.

In Step S1304, an upper limit threshold value MAX is set to the obtained synchronism margin degree Mgn, and a lower limit threshold value MIN is set to the obtained synchronism margin degree Mgn. Then, the processing proceeds to Step S1309.

In Step S1305, the upper limit threshold value MAX is compared with the obtained synchronism margin degree Mgn. In the case where the upper limit threshold value MAX is smaller than the synchronism margin degree Mgn, the processing proceeds to Step S1306, and otherwise the processing proceeds to Step S1307.

In Step S1306, the upper limit threshold value MAX is updated to the obtained synchronism margin degree Mgn, and the processing proceeds to Step S1309.

In Step S1307, the lower limit threshold value MIN is compared with the obtained synchronism margin degree Mgn. In the case where the lower limit threshold value MIN is larger than the synchronism margin degree Mgn, the processing proceeds to Step S1308, and otherwise the processing proceeds to Step S1309.

In Step S1308, the lower limit threshold value MIN is updated to the obtained synchronism margin degree Mgn, and the processing proceeds to Step S1309.

In Step S1309, it is determined whether or not the width in which the measured synchronism margin degree Mgn can take is larger than the design guarantee value of the apparatus. In the case where the width is larger than the design guarantee value, the processing proceeds to Step S1310, and otherwise the processing proceeds to Step S1311.

In Step S1310, the user is notified of an error by an LED or the like (not shown), and the processing proceeds to Step S1311.

In Step S1311, the processing is completed.

Accordingly, the upper limit threshold value MAX and the lower limit threshold value MIN of the reliability threshold value can be calculated based on the maximum value and the minimum value of the synchronism margin degree Mgn calculated in a period during which the reliability threshold optimization processing is performed. Thus, the user can calculate a threshold value based on the maximum value and the minimum value of the synchronism margin degree in the entire region by moving the movable member and the fixed member in the entire region after starting the reliability threshold value optimization processing and completing the reliability threshold value optimization processing. Note that, in the case where a drive system is provided, the drive system may be controlled to drive the entire region automatically, to thereby calculate a threshold value automatically, and complete the processing.

Further, in the case where the width of the upper limit threshold value MAX and the lower limit threshold value MIN does not fall within the design guarantee value, the user is notified of this case. Therefore, the user can confirm whether or not there has been an error caused by the effect of motes during the reliability threshold value optimization processing.

Further, an average of the upper limit threshold value MAX and the lower limit threshold value MIN is a difference between the center of the synchronism margin degree in design and the center in actual measurement. Therefore, an offset for correcting the difference may be stored so as to be used for calculating an absolute value.

Next, the effect of this embodiment is described with reference to FIGS. 14A to 14C.

Figure 14A:
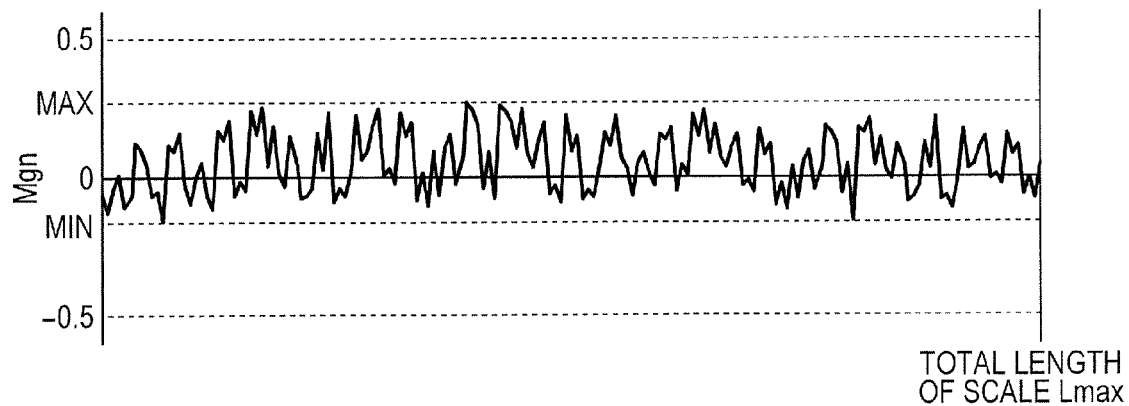
FIG. 14A is a graph showing a synchronism synchronization error and an absolute position reliability determination criterion in the second embodiment.

FIG. 14A is a graph showing the synchronism margin degree Mgn, and the upper limit threshold value MAX and the lower limit threshold value MIN obtained in the above-mentioned adjustment (in the reliability threshold value optimization processing).

Figure 14B:
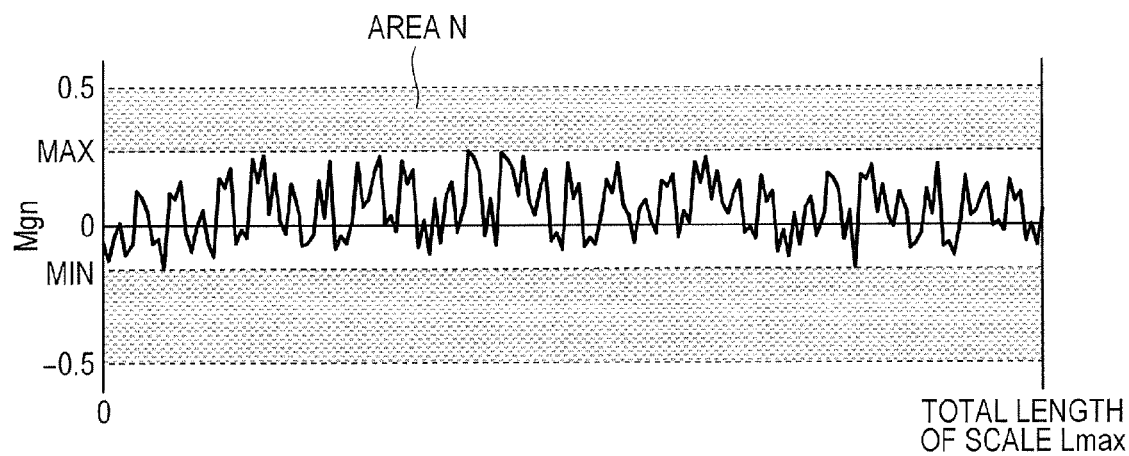
FIG. 14B is a graph showing a synchronism synchronization error and an absolute position reliability determination criterion in the second embodiment.

FIG. 14B is a graph in the case where the absolute position reliability determination processing is performed through use of the upper limit threshold value MAX and the lower limit threshold value MIN. An area N in gray corresponds to an area in which it is determined that the absolute position is not reliable. In the case where there is no change in a state from the adjustment, the obtained synchronism margin degree Mgn does not fall within the area N.

Figure 14C:
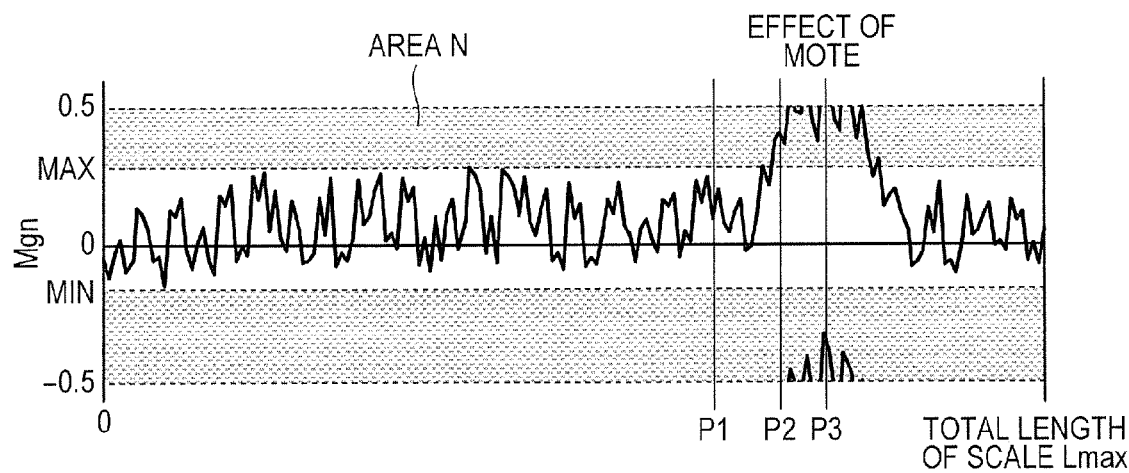
FIG. 14C is a graph showing a synchronism synchronization error and an absolute position reliability determination criterion in the second embodiment.

FIG. 14C is a graph in the case where the synchronism margin degree Mgn is degraded because motes adhere to the scale after the adjustment is performed in the state of FIG. 14A. As shown by the graph, at positions including a position P1 where there is no effect by motes, it is not determined that the calculated absolute position is not reliable. On the contrary, at positions where the synchronism margin degree is degraded due to the effect of motes as in positions P2 and P3, it can be determined that the absolute position is not reliable.

Accordingly, the largest area N that absorbs a variation of individuals and excludes the synchronism margin degree Mgn to be calculated at the normal time can be set by setting a reliability threshold value based on the measured value of the synchronism margin degree Mgn in the normal state (state in which there are no motes adhering to the scale). That is, a threshold value to be used for determining the reliability of an absolute value is calculated appropriately, and the aggravation of the state from the adjustment can be detected accurately.

Note that, in this embodiment, the case where the absolute position reliability determination is performed only once for synchronism with respect to a first relative position signal Inc1 has been described. However, in the case where the absolute position reliability determination is performed a plurality of times with respect to a plurality of relative position signals such as the first relative position signal Inc1 and a second relative position signal Inc2, the similar effect or more can be obtained by applying threshold values independently set to the respective relative position signals to perform the absolute position reliability determination. That is, as compared to the case of performing the absolute position reliability determination with respect to a combination, the ABS reliability determinator (determining unit) 107 can confirm the higher reliability by determining whether or not the synchronism calculation of two relative position signals (phases) of three or more calculated relative position signals (phases) (first relative position signal Inc1, second relative position signal Inc2, third relative position signal Inc31, . . . ) is normal based on the threshold values independently set to the respective plurality of combinations. The reason for this is as follows.

In the case where a value that is not normal is read from a signal in a certain track due to the effect of motes, the result obtained by performing Vernier calculation through use of the signal is also influenced by the motes. In the case where the synchronism processing is performed through use of one of the signal influenced by motes and the Vernier calculation result, the synchronism margin degree is influenced by motes. Therefore, in the case where the synchronism calculation is performed a plurality of times, a plurality of synchronism processings is influenced by motes.

FIGS. 15A, 15B, 16A, and 16B are graphs each showing the synchronism margin degree, the threshold value of the absolute position reliability determination, and the effect of motes in the synchronism calculation in the case where a signal in a certain track is influenced by motes, in a plurality of synchronism calculations. Note that, only synchronism A and synchronism B that are two synchronism calculations influenced by motes are shown for simplification.

FIG. 15A is a graph showing the synchronism margin degree of synchronism A in the reliability determination threshold value calculation, and FIG. 15B is a graph showing the synchronism margin degree of the synchronism A in the case of the contamination of motes.

FIG. 16A is a graph showing the synchronism margin degree of synchronism B in the reliability determination threshold value calculation, and FIG. 16B is a graph showing the synchronism margin degree of the synchronism B in the case of the contamination of motes.

The synchronism margin degree of the synchronism A shown in FIG. 15A has less margin from the design stage, and for example, as indicated by the position P3 of FIG. 15B, there is a place in which it is determined that the absolute position is reliable even when the synchronism calculation fails due to the effect of motes and the absolute position is detected erroneously.

On the other hand, the synchronism margin degree of the synchronism B shown in FIG. 16A has sufficient margin in the design stage, and for example, as shown in FIG. 16B, the synchronism calculation does not fail due to the effect of motes.

As a result of the reliability determination threshold calculation, the threshold value of the synchronism A is calculated to be MAXa and MINa, and the threshold value of the synchronism B is calculated to be MAXb and MINb. Therefore, even when it is determined that there is reliability in the absolute position reliability determination on the synchronism A side at the position P3, an error caused by motes is detected on the synchronism B side, and it can be determined that the absolute position is not reliable as a whole.

Accordingly, in the case where a plurality of synchronism calculations is performed, the reliability of the absolute position can be determined with higher accuracy.

In the above-mentioned embodiments, the user is notified of an error as an operation in the case where the absolute value is not reliable. However, in the case where the absolute position Pabs is reliable, the absolute position Pabs may be determined as the absolute position of the movable member 21, and in the case where the absolute position Pabs is not reliable, an absolute position may be obtained again without determining the absolute position Pabs as the absolute position of the movable member 21. That is, even in the case where the absolute position is a position that is not reliable, an accurate absolute position can be obtained by re-calculating the absolute position until the absolute position becomes a position that is reliable.

It should be understood that, in the case where positional information is required immediately, the absolute position that is not reliable may be used as a provisional position, and the absolute position may be calculated repeatedly until a reliable absolute position is calculated. Further, in the case where there is a drive system, the position may be moved until the absolute position that is reliable is calculated.

In particular, very high effects are exhibited in the case of a configuration in which the absolute position Pabs is calculated at the time of power-on and thereafter the position of the movable member is detected by the relative position calculator that performs relative position detection only based on the first relative position signal Inc1 (alternatively, one or more relative position signals of a plurality of relative position signals) without performing signal switching. That is, the reliability of the absolute position can be calculated only based on a signal required for calculating the absolute position Pabs. Therefore, an accurate absolute position is obtained immediately in the normal case, and after that, the processing can be shifted to the relative position detection processing by a unit (CPU, etc.) for shifting the absolute position obtaining method according to the above-mentioned embodiment to the method of calculating a relative position by the relative position calculator. Further, in the case of such a configuration, hitherto, when the absolute position is detected erroneously due to the failure of the synchronism calculation, the relative position detection is performed based on the erroneously detected absolute position, with the result that the absolute position is always detected as an erroneous position. However, this problem can be solved by using the present invention as a determination criterion for shifting to the relative position detection.

Further, the threshold value of the absolute position reliability determination is set so that the detected absolute position is determined to be reliable at all times in the normal case. This is because, when the threshold value is small, there is a risk in that the user may be notified of an error even when there is no error. The threshold value may be switched by the operation in the case where the absolute position is not reliable as described above. For example, in the case of a configuration in which the absolute position is obtained again, even if it is determined that there is no reliability in the normal case, it is appropriate that the absolute position be obtained again. Therefore, it is also considered to set a threshold value to be small so as to obtain an area in which it is determined that the absolute position is reliable without fail.

The method of setting a threshold value is not limited to the above, and the threshold value is set appropriately by an error factor assumed as a design, a method of using a position detecting apparatus, the movement during the detection of an error, or the like. In general, when the threshold value is large, as indicated by the position P3 of FIG. 16B, there is a risk in that the absolute position may be erroneously determined to be reliable even in the area in which the absolute position is detected erroneously, and hence care should be taken.

Note that, this embodiment exemplifies the effect of motes as the cause for degrading the synchronism margin degree. However, the present invention is effective for all the effects leading to an error of synchronism calculation, such as scratches on a scale, strain of the scale and a sensor caused by an external force or the like, a change in various characteristics depending on the temperature, a shift in a plurality of signal obtaining timings caused by the movement of a movable body.

Further, it is determined that the synchronism margin degree is degraded, and the processing can be changed. Therefore, the accuracy of various components of the position detecting apparatus can also be alleviated. Accordingly, the effects such as the improvement of assemblability, the reduction in number of components, adjustment-free, and downsizing can also be expected.

Further, this embodiment includes the scale switcher 103 and obtains a signal from the ABS sensor 104 in time division. However, the present invention is not limited thereto, and the same effect can be obtained even in the configuration in which a plurality of signals is obtained simultaneously from the ABS sensor 104.

Further, although the example of using an optical encoder as an encoder has been described, the present invention is not limited thereto, and a magnetic or electrostatic encoder may be used.

Further, although the position detecting apparatus for calculating an absolute position has been described, the same effect can be obtained even in a position detecting apparatus having a plurality of cycles over the entire region.

A lens apparatus capable of exhibiting the effect of the present invention can be realized by applying the position detecting apparatus of the embodiments to a lens apparatus including a movable optical member so as to detect the position of the movable optical member. Further, an image pickup apparatus capable of exhibiting the effect of the present invention can be realized by applying the position detecting apparatus of the embodiments to an image pickup apparatus including a lens apparatus including a movable optical member and a camera apparatus so as to detect the position of the movable optical member.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-224848, filed Oct. 30, 2013, which is hereby incorporated by reference herein in its entirety.

What is claimed is:

1. A position detecting apparatus, comprising:
a scale comprising a plurality of pattern arrays formed in different cycles in a movement direction;
an obtaining unit configured to obtain a plurality of signals in accordance with a position of the plurality of pattern arrays;
a phase calculator configured to calculate a plurality of phases of the plurality of signals, respectively;
a synchronism calculator configured to calculate a relative positional relationship between the obtaining unit and the scale by performing synchronism calculation of the plurality of phases calculated by the phase calculator;
a synchronization error calculator configured to calculate a synchronization error in the synchronism calculation; and
a determining unit configured to determine whether or not the synchronism calculation is normal by comparing the synchronization error and a predetermined threshold value with each other.

2. A position detecting apparatus according to claim 1, further comprising a position determinator configured to determine the relative positional relationship calculated by the synchronism calculator as a position of the obtaining unit with respect to the scale, based on the determination by the determining unit.

3. A position detecting apparatus according to claim 1, further comprising a notification unit configured to notify a user of an error when it is determined by the determining unit that the synchronism calculation is abnormal.

4. A position detecting apparatus according to claim 1,
wherein the plurality of pattern arrays include at least three pattern arrays formed in different cycles in the movement direction,
wherein the obtaining unit is configured to obtain at least three signals based on the at least three pattern arrays in accordance with a position of the obtaining unit in the movement direction with respect to the scale,
wherein the plurality of phases include at least three phases, the phase calculator configured to calculate the at least three phases of at least three periodic signals, respectively, of the plurality of signals, the at least three periodic signals having different cycles with respect to the movement direction,
wherein the synchronism calculator is configured to perform a plurality of synchronism calculations of two phases of the at least three phases on a plurality of combinations of phases, respectively, and to calculate a plurality of positions of the obtaining unit with respect to the scale in the plurality of combinations of phases, respectively,
wherein the determining unit is configured to compare the synchronization error and the predetermined threshold value with each other for determining whether or not the plurality of synchronism calculations are normal, and
wherein the determining unit is configured to determine whether or not each synchronism calculation of the plurality of synchronism calculations of the two phases is normal, based on an independent threshold value set independently for each of the plurality of combinations of phases.

5. A position detecting apparatus according to claim 1, wherein each independent threshold value comprises a maximum value and a minimum value of the synchronization error calculated by the synchronization error calculator in an entire movable area of the scale.

6. A position detecting apparatus according to claim 1,
wherein the plurality of pattern arrays comprises a plurality of reflective pattern arrays formed in different cycles in the movement direction, and
wherein the obtaining unit comprises a light source and a plurality of light receivers configured to receive light emitted from the light source and reflected by one or more reflective pattern arrays of the plurality of reflective pattern arrays.

7. A position detecting apparatus according to claim 2, wherein the position of the obtaining unit with respect to the scale is a first position of the obtaining unit with respect to the scale, the position detecting apparatus further comprising:
a relative position calculator configured to calculate a second position of the obtaining unit with respect to the scale based on the first position of the obtaining unit with respect to the scale as a reference position and at least one signal of the plurality of signals; and
a unit configured to switch between obtaining of the first position of the obtaining unit with respect to the scale determined by the position determinator and obtaining of the second position of the obtaining unit with respect to the scale calculated by the relative position calculator.

8. A position detecting method, comprising:
obtaining, via an obtaining unit, a plurality of signals in accordance with a position in a movement direction with respect to a scale, the scale comprising a plurality of pattern arrays formed in different cycles in the movement direction;
calculating a plurality of phases of the plurality of signals, respectively;
calculating a relative positional relationship between the obtaining unit and the scale by performing synchronism calculation of the calculated plurality of phases;
calculating a synchronization error in the synchronism calculation; and
determining whether or not the synchronism calculation is normal by comparing the synchronization error and a predetermined threshold value with each other.

9. A position detecting method according to claim 8, further comprising determining the calculated relative positional relationship as a position with respect to the scale based on the determining whether or not the synchronism calculation is normal.

10. A lens apparatus, comprising:
a movable optical member; and
a position detecting apparatus serving as a position detecting apparatus for the movable optical member, wherein the position detecting apparatus comprises:
a scale comprising a plurality of pattern arrays formed in different cycles in a movement direction;
an obtaining unit configured to obtain a plurality of signals in accordance with a position of the plurality of pattern arrays;
a phase calculator configured to calculate a plurality of phases of the plurality of signals, respectively;
a synchronism calculator configured to calculate a relative positional relationship between the obtaining unit and the scale by performing synchronism calculation of the plurality of phases calculated by the phase calculator;
a synchronization error calculator configured to calculate a synchronization error in the synchronism calculation; and
a determining unit configured to determine whether or not the synchronism calculation is normal by comparing the synchronization error and a predetermined threshold value with each other.

11. An image pickup apparatus, comprising:
a lens apparatus; and
a camera apparatus,
wherein the lens apparatus comprises:
a movable optical member; and
a position detecting apparatus serving as a position detecting apparatus for the movable optical member, wherein the position detecting apparatus comprises:
a scale comprising a plurality of pattern arrays formed in different cycles in a movement direction;
an obtaining unit configured to obtain a plurality of signals in accordance with a position of the plurality of pattern arrays;
a phase calculator configured to calculate a plurality of phases of the plurality of signals, respectively;
a synchronism calculator configured to calculate a relative positional relationship between the obtaining unit and the scale by performing synchronism calculation of the plurality of phases calculated by the phase calculator;
a synchronization error calculator configured to calculate a synchronization error in the synchronism calculation; and
a determining unit configured to determine whether or not the synchronism calculation is normal by comparing the synchronization error and a predetermined threshold value with each other.

* * * * *